(12) United States Patent
Dupuy et al.

(10) Patent No.: US 12,440,398 B2
(45) Date of Patent: Oct. 14, 2025

(54) LIFT ASSEMBLY WITH HANDRAILS FOR A PASSENGER VEHICLE

(71) Applicant: The Braun Corporation, Winamac, IN (US)

(72) Inventors: James R. Dupuy, Kokomo, IN (US); Michael Alexander, West Lafayette, IN (US)

(73) Assignee: The Braun Corporation, Winamac, IN (US)

( * ) Notice: Subject to any disclaimer, the term of this patent is extended or adjusted under 35 U.S.C. 154(b) by 498 days.

(21) Appl. No.: 18/165,378

(22) Filed: Feb. 7, 2023

(65) Prior Publication Data
US 2023/0248592 A1 Aug. 10, 2023

Related U.S. Application Data

(60) Provisional application No. 63/307,838, filed on Feb. 8, 2022.

(51) Int. Cl.
*A61G 3/06* (2006.01)

(52) U.S. Cl.
CPC .............. *A61G 3/062* (2013.01); *A61G 3/067* (2016.11); *A61G 2220/16* (2013.01)

(58) Field of Classification Search
CPC .... A61G 2220/16; A61G 3/067; A61G 3/062; A61G 3/02; A61G 3/061; B60P 1/4471;

(Continued)

(56) References Cited

U.S. PATENT DOCUMENTS

| 4,214,849 A | * | 7/1980 | Downing | A61G 3/062 |
| | | | | 414/545 |
| 4,718,812 A | * | 1/1988 | Smalley | B60P 1/4442 |
| | | | | 296/61 |

(Continued)

FOREIGN PATENT DOCUMENTS

WO 2003059685 A2 7/2003

OTHER PUBLICATIONS

Invitation to Pay Additional Fees, PCT/US2023/062087, May 25, 2023, 7 pages, International Searching Authority for the European Patent Office.

(Continued)

*Primary Examiner* — Glenn F Myers
(74) *Attorney, Agent, or Firm* — Daniel Tallitsch; Tyler Schultz

(57) ABSTRACT

A wheelchair lift for a passenger vehicle such as a passenger bus, a motorcoach, or a class A motorhome. The wheelchair lift includes a housing having sidewalls and a plurality of bearings and a carriage supporting one or more of electrical, mechanical, and hydraulic components. A lift assembly, coupled to the housing, includes a first and second scissor leg assembly couples to a platform. First and second handrail assemblies are respectively coupled to first and second sidewalls of the platform. The first handrail assembly includes a lower handrail shield coupled to a first handrail, and an upper handrail shield rotatably coupled to the lower handrail shield and moveable between a lowered position and a raised position, wherein the upper handrail shield in the lowered position is moveable with the lower handrail shield between a storage location and a boundary location.

23 Claims, 15 Drawing Sheets

(58) Field of Classification Search
CPC ......... B60P 1/4414; B60P 1/431; B60P 1/435; B60P 1/43; B60P 1/438; B66F 7/065; B66F 7/08; B65G 69/30
See application file for complete search history.

(56) References Cited

U.S. PATENT DOCUMENTS

| | | | |
|---|---|---|---|
| 5,040,936 A * | 8/1991 | Rhea | A61G 3/062 |
| | | | 187/901 |
| 5,165,839 A | 11/1992 | Aoki | |
| 2003/0213653 A1* | 11/2003 | Morris | A61G 3/067 |
| | | | 187/269 |
| 2014/0154035 A1* | 6/2014 | Walker | B60P 1/44 |
| | | | 414/537 |

OTHER PUBLICATIONS

International Search Report and Written Opinion, PCT/US2023/062087, Jul. 17, 2023, 14 pages, International Searching Authority for the European Patent Office.

* cited by examiner

LIFT ASSEMBLY WITH HANDRAILS FOR A PASSENGER VEHICLE

CROSS REFERENCE TO RELATED APPLICATIONS

This application claims priority to U.S. Provisional Patent Application Ser. No. 63/307,838, filed on Feb. 8, 2022, which is incorporated herein by reference.

FIELD OF THE DISCLOSURE

The present application relates to a passenger vehicle for transporting one or more passengers, and more particularly to a modified passenger vehicle having a lift assembly with handrails which enables a physically limited passenger using a wheelchair to enter and exit the vehicle.

BACKGROUND

Vehicle manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by adding and/or removing certain parts or structures within a vehicle to accommodate the physically limited passenger. For example, in one configuration, a van is retrofitted with a ramp to enable a physically limited individual using a wheelchair to enter and exit the vehicle without the assistance of another individual. In another configuration a passenger bus, motorcoach, or different classes of motorhome, such as class A, are retrofitted with a lift assembly that enables a physically limited passenger to enter or to exit the vehicle. In some embodiments, the lift assembly is adapted for a physically limited passenger using a wheelchair or other mobility device.

Known products for retrofitting a vehicle, such as a van, sport utility vehicle, and a bus include lift assemblies, wheelchair lifts, lift platforms, and lowered floor surfaces. In some instances, a door or door entry of an original equipment manufacturer (OEM) vehicle is enlarged or otherwise modified to permit entry and exit of the physically limited individual through what is known as the assisted entrance.

In some instances, the lift assembly is stored below the conventional vehicle floor and is deployed to accommodate entry and exit of the physically limited individual through a side door or other entrance of the vehicle. Challenges may arise related to deploying and stowing the lift assembly and ensuring that the lift assembly moves consistently and repeatedly between the deployed position and the stowed position.

SUMMARY OF THE EMBODIMENTS

In one embodiment, there is provided a wheelchair lift for a passenger bus including a housing having sidewalls and a plurality of bearings, and a carriage supporting one or more of electrical, mechanical, and hydraulic components. A lift assembly, coupled to the housing, includes a first rail and a second rail supported by the plurality of bearings, a first scissor leg assembly coupled to the first rail, and a second scissor leg assembly coupled to the second rail. Each of the first scissor leg assembly and the second scissor leg assembly move between an expanded and a collapsed condition. A platform is coupled to the first scissor leg assembly and the second scissor leg assembly, and includes a first sidewall, a second sidewall, and a platform plate disposed between the first sidewall and the second sidewall. A first handrail assembly is coupled to the first sidewall and includes a lower handrail shield coupled to a first handrail and an upper handrail shield rotatably coupled to the lower handrail shield and moveable between a lowered position and a raised position with respect to the lower handrail shield. The upper handrail shield in the lowered position is moveable with the lower handrail shield between a storage location and a boundary location.

In some embodiments, the wheelchair lift further includes a second handrail assembly coupled to the second sidewall, wherein the second handrail assembly includes a lower handrail shield coupled to a second handrail, and an upper handrail shield rotatably coupled to the lower handrail shield. The upper handrail shield is moveable between a lowered position and a raised position with respect to the lower handrail shield, wherein the upper handrail shield in the lowered position is moveable with the lower handrail shield between a storage location and a boundary location.

In some embodiments, the wheelchair lift includes wherein the first handrail assembly includes a gas spring coupled to the upper handrail shield and to the lower handrail shield, wherein the gas spring maintains a position of the upper handrail shield with the lower handrail shield.

In some embodiments, the wheelchair lift includes wherein the second handrail assembly includes a gas spring coupled to the upper handrail shield and to the lower handrail shield, wherein the gas spring maintains a position of the upper handrail shield with the lower handrail shield.

In some embodiments, the wheelchair lift includes wherein the first handrail assembly and the second handrail assembly each include a first position extending generally perpendicular to the platform plate and a second position generally parallel to the platform plate.

In some embodiments, the wheelchair lift includes wherein the first handrail assembly and the second handrail assembly are in the second position, and one of the first and second handrail assemblies overlaps the other of the first and second handrail assemblies.

In some embodiments, the wheelchair lift includes wherein the first handrail is rotatably coupled to the first sidewall and the second handrail is rotatably coupled to the second sidewall.

In some embodiments, the wheelchair lift includes wherein the first handrail slides longitudinally along the first sidewall and the second handrail slides longitudinally along the second sidewall.

In some embodiments, the wheelchair lift includes wherein the first handrail assembly includes a first latch assembly having a latched position and an unlatched position, wherein in the latched position a pin engages the first siderail to prevent the first handrail assembly from moving between the first position and the second position.

In some embodiments, the wheelchair lift includes wherein the second handrail assembly includes a second latch assembly having a latched position and an unlatched position, wherein in the latched position a pin engages the second siderail to prevent the second handrail assembly from moving between the first position and the second position.

In some embodiments, the wheelchair lift includes wherein the first latch assembly includes a latch handle coupled to a linkage and a slide bar coupled to the linkage, wherein the latch handle moves the slide bar into engagement with the handrail in the latched position and out of engagement with the handrail in the unlatched position.

In some embodiments, the wheelchair lift includes wherein the linkage includes a first end fixedly coupled to the first siderail and the second end fixedly coupled to the slide bar, wherein the slide bar moves along the siderail in response to the latch handle moving from latched position to engage the siderail to the pin and an unlatched position to disengage the siderail from the pin.

In some embodiments, the wheelchair lift includes wherein the wherein the pin is connected to the siderail.

In another embodiment, there is provided a passenger bus including a body having an entrance, a storage compartment located below the entrance, and a wheelchair lift including a stowed position located within the storage compartment and having a deployed position extending from the storage compartment. The wheelchair lift includes a housing having sidewalls and a plurality of bearings, a carriage supporting one or more of electrical, mechanical, and hydraulic components, and a lift assembly coupled to the housing. The lift assembly includes a first rail and a second rail, wherein the first rail and second rail are supported by the plurality of bearings. A first scissor leg assembly is coupled to the first rail and a second scissor leg assembly is coupled to the second rail, wherein each of the first scissor leg assembly and the second scissor leg assembly move between an expanded and a collapsed condition. A platform is coupled to the first scissor leg assembly and the second scissor leg assembly and the platform includes a first sidewall, a second sidewall, and a platform plate disposed between the first sidewall and the second sidewall. A first handrail assembly is coupled to the first sidewall and includes a lower handrail shield coupled to a first handrail, and an upper handrail shield rotatably coupled to the lower handrail shield and moveable between a lowered position and an raised position with respect to the lower handrail shield, wherein the upper handrail shield in the lowered position is moveable with the lower handrail shield between a storage location and a boundary location.

In some embodiments the passenger bus includes a second handrail assembly coupled to the second sidewall, wherein the second handrail assembly includes a lower handrail shield coupled to a second handrail, and an upper handrail shield rotatably coupled to the lower handrail shield and moveable between a lowered position and a raised position with respect to the lower handrail shield. The upper handrail shield in the lowered position is moveable with the lower handrail shield between a storage location and a boundary location.

In some embodiments the passenger bus includes wherein the first handrail assembly includes a gas spring coupled to the upper handrail shield and to the lower handrail shield, wherein the gas spring maintains a position of the upper handrail shield with the lower handrail shield.

In some embodiments the passenger bus includes wherein the second handrail assembly includes a gas spring coupled to the upper handrail shield and to the lower handrail shield, wherein the gas spring maintains a position of the upper handrail shield with the lower handrail shield.

In some embodiments the passenger bus includes wherein the first handrail assembly and the second handrail assembly each include a first position extending generally perpendicular to the platform plate and a second position generally parallel to the platform plate.

In some embodiments the passenger bus includes wherein when the first handrail assembly and the second handrail assembly are in the second position, one of the first and second handrail assemblies overlaps the other of the first and second handrail assemblies.

In some embodiments the passenger bus includes wherein the first handrail is rotatably coupled to the first sidewall and the second handrail is rotatably coupled to the second sidewall.

In some embodiments the passenger bus includes wherein the first handrail slides longitudinally along the first sidewall and the second handrail slides longitudinally along the second sidewall.

In some embodiments the passenger bus includes wherein the first handrail assembly includes a first latch assembly having a latched position and an unlatched position, wherein in the latched position a pin engages the first siderail to prevent the first handrail assembly from moving between the first position and the second position.

In a further embodiment there is provided a method of moving a wheelchair lift from a stowed position to a deployed position, wherein the wheelchair lift includes a first siderail assembly and a second siderail assembly respectively connected to a first sidewall and to a second sidewall coupled to a platform. The method includes: moving the first siderail assembly longitudinally along the length of the first sidewall in response to movement of a first latch arm; moving the second siderail assembly longitudinally along the length of the second sidewall in response to movement of a second latch arm; preventing pivotal movement of the first siderail assembly with respect to the first sidewall by engaging a first pin during longitudinal movement of the first siderail assembly; and preventing pivotal movement of the second siderail assembly with respect to the second sidewall by engaging a second pin during longitudinal movement of the first siderail assembly.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION OF THE EMBODIMENTS

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
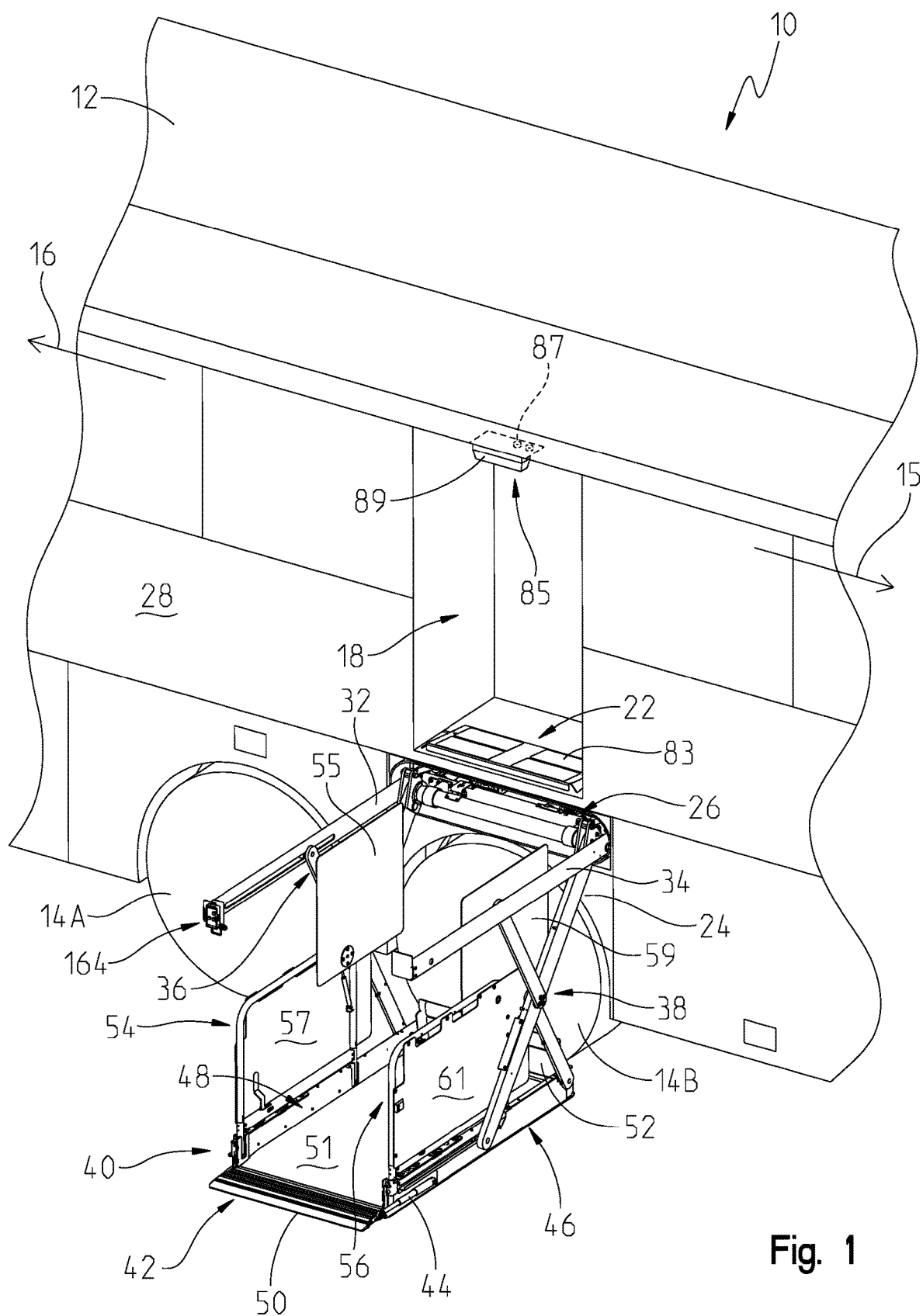
FIG. 1 illustrates an elevational perspective view of a passenger vehicle including a wheelchair lift assembly.

FIG. 1 illustrates a vehicle 10, commonly identified as a passenger bus, available from any number of United States and foreign manufacturers. In the illustrated embodiment, the vehicle 10 includes one type of body construction, but other vehicles having other types of body constructions, are also contemplated for the present disclosure. Consequently, the use of a vehicle herein includes all types and kinds of passenger vehicles including buses, motorcoaches, and class A motorhomes. In addition, while the vehicle 10 is illustrated in FIG. 1 as a bus, the present disclosure is directed to all passenger vehicles carrying one or more passengers.

The vehicle 10 includes a body 12 operatively coupled to wheels 14 that engage a road surface. The entire body 12 is not shown for ease of illustration, but a front portion of the bus 10 extends in a direction 15 away from the wheels 14 and a rear portion of the bus extends in a direction 16 away from the wheel 14A. Front wheels are not shown and the wheel 14A is one of a set of rear wheels and the wheel 14B is one of a set of middle wheels and is located above the wheel 14B and between the front wheels (not shown) and the rear wheels 14A. A passenger entrance 18 is located above the middle wheels and typically includes a door, not shown, that opens and closes to enable a passenger to enter and to exit the vehicle 10.

A ski locker compartment 20 is located below the entrance 18 and a floor 22 is located above the compartment 20 to provide a support surface for a passenger. The ski locker 20, as provided by an OEM manufacturer, is used to store skis or other personal belongings, but in this embodiment the ski locker compartment 20 is used to stow a wheelchair lift assembly 24. While the present embodiment is illustrated to use a ski locker compartment 20 for stowing the wheelchair lift 24, other embodiments include other types of compartments configured to stow the wheelchair lift 24. In addition, other locations of the compartment 20 are contemplated including compartments not located above wheel 14B, but located along the length of the vehicle 10, as well as a compartment located at the rear of the vehicle 10.

The wheelchair lift 24 includes a housing (not shown) that is fixedly located in the compartment 20. The compartment 20 extends from a first side 28 of the vehicle 10 towards a second side of the vehicle 10, not shown. An opening of the housing is located at the first side 28 of the vehicle 10 and the wheelchair lift 24 is stowed and deployed by the carriage 26. The housing includes a plurality of roller bearings upon which a first rail 32 and a second rail 34 of the wheelchair lift 24 are supported as the wheelchair left 24 is stowed and deployed from the compartment 20. The wheelchair lift 24 when collapsed fits entirely within the compartment 20 when stowed in the compartment. A door or flexible shield, not shown, close the compartment opening to protect the wheelchair lift 24 from the elements.

Figure 2:
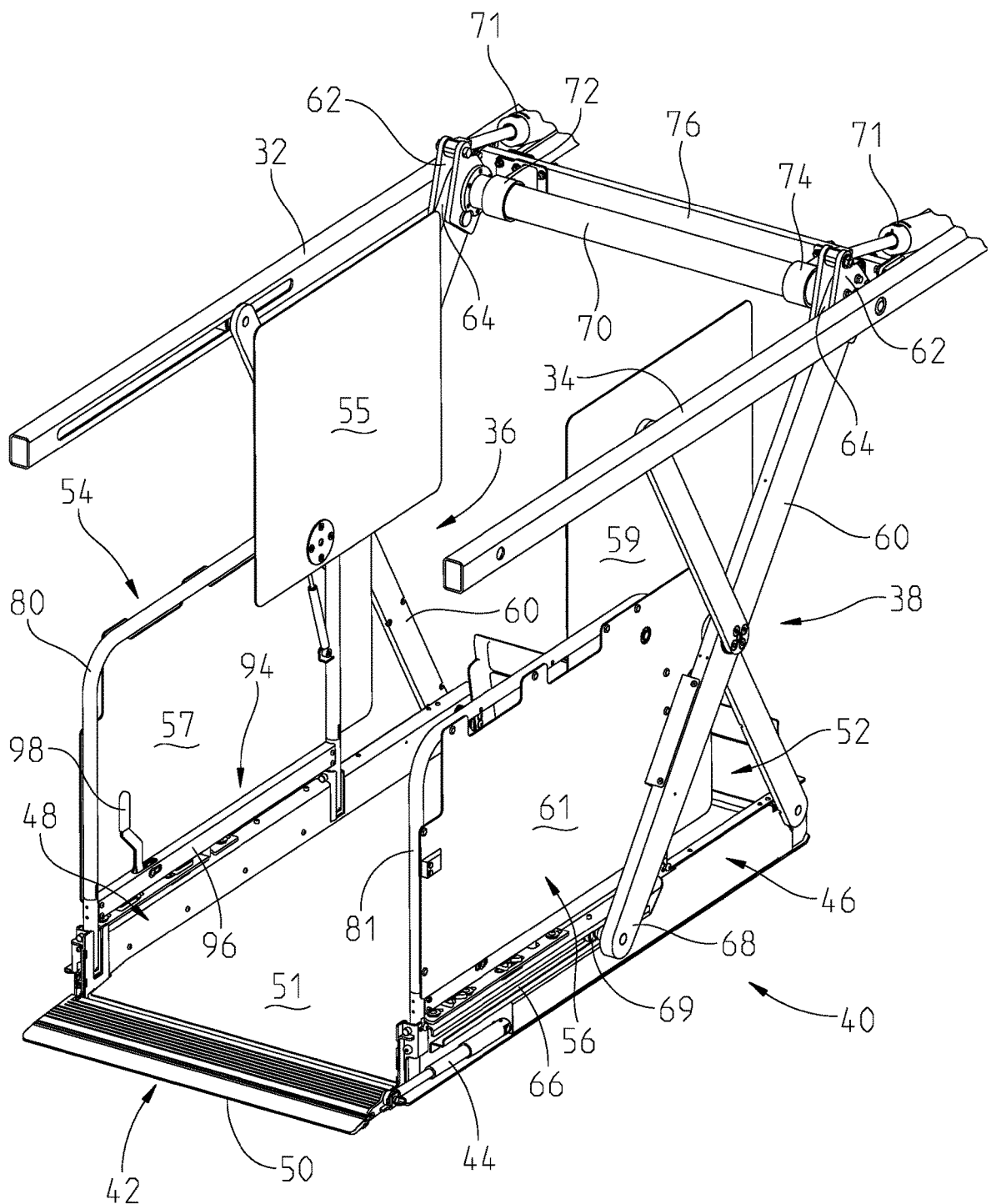
FIG. 2 illustrates a perspective view of one embodiment of a wheelchair lift assembly including a platform.

The wheelchair lift 24, as seen in FIGS. 1 and 2, further includes a first scissor leg assembly 36 coupled to the first rail 32 and a second scissor leg assembly 38 coupled to the second rail 34. A platform assembly 40 is coupled to each of the first scissor leg assembly 36 and the second scissor leg assembly 38. A ramp plate 42 is rotatably coupled to the platform assembly 40 and moves between a lowered position as illustrated in FIGS. 1 and 2 and to a raised position not shown.

The ramp plate 42 is raised, or held in place, by an actuator 44 connected to the ramp plate 42 and to a first sidewall 46 of the platform assembly 40. In different embodiments, the actuator is actuated automatically or manually by an operator. A second sidewall 48 of the platform assembly 40, in one embodiment, does not support an actuator for positioning of the ramp plate 42, but in other embodiments, an actuator is connected between the ramp plate 42 and the second sidewall 48. The ramp plate 42 includes an inclined front edge 50 to provide for a gradual transition of wheels of a wheelchair between a road surface, for instance, and a platform plate 51. A barrier 52 is rotatably coupled adjacent to the platform plate 51 at an end of the platform plate 51 opposite the end at which the ramp plate 42 is located. A first handrail assembly 54 and second handrail assembly 56 each move between open and closed positions. Hand rail assembly 54 includes an upper panel or upper shield 55 and a lower panel or lower shield 57. Handrail assembly 56 includes an upper panel or upper shield 59 and a lower panel or upper shield 61.

As further seen in FIG. 2, each of the first scissor leg assembly 36 and the second scissor leg assembly 38 is similar in construction and the following description of scissor leg assembly 38 applies to a description of the other scissor leg assembly 36. Each of the scissor leg assemblies 36 and 38 include an arm 60 extending between a bracket 62, located at one end 64 of the arm 60, and a slot 66 at which another end 68 of the arm 60 is slidingly coupled. The end 68 slides along the slot 66 as the wheelchair lift 24 moves between a deployed position as illustrated in FIGS. 1 and 2 and a collapsed position. A roller bearing 69 is attached to the end 68 and enables the sliding movement of the end 68 of arm 60 along the slot 66.

The brackets 62 are each fixedly connected to ends 64 of the arms 60. A cylinder 70 extends between brackets 62. The cylinder 70 is fixedly connected to the brackets 60 such that rotation of the cylinder 70 moves the wheelchair lift 24 between the deployed position and the collapsed position used for the stowed position. The cylinder 70 is rotatably coupled to the carriage 26 with a first ring bracket 72 and a second ring bracket 74 each of which are fixedly coupled to a bar 76 of a carriage 26, that supports electrical, mechanical, and hydraulic components. Ends of the first rail 32 and the second rail 34 are fixedly connected to the bar 76 to form sides of a carriage 26. A plate or other supporting structure, not shown, extends from the bar 76 and between the first rail 32 and the second rail 34 to support the components located at the carriage 26. In different embodiments, the cylinder 70 includes one of a hollow tube or a solid cylindrical rod. Hydraulic cylinders 71, which are connected to brackets 62, raise and lower the lift assembly 24.

In FIG. 1, a transition plate 83 is affixed at a threshold of the vehicle defined by the floor 22 and provides a smooth and relatively seamless transition for a wheelchair to move over the barrier 52 when the barrier 52 is level with the floor 22. A threshold module 85 is located at a ceiling of the vehicle 10 and includes an ultrasonic sensor 87 and a strobe/alarm 89. The ultrasonic sensor 87 includes a transmitter and receiver, as is understood by those skilled in the art, and identifies whether an individual, or other object, is located at the threshold, i.e. beneath the sensor 87. If an individual, or other object, is identified there and the platform 40 is not level with the floor, the strobe/alarm 89 is actuated to indicate that an undesirable condition may be occurring.

Additional features of the lift assembly including the wheelchair lift 24, the housing 78, and carriage 26 are further disclosed in co-pending patent application entitled "Lift Assembly for a Passenger Vehicle" filed on the same day as this patent application, which is incorporated in its entirety by reference herein.

Figure 3:
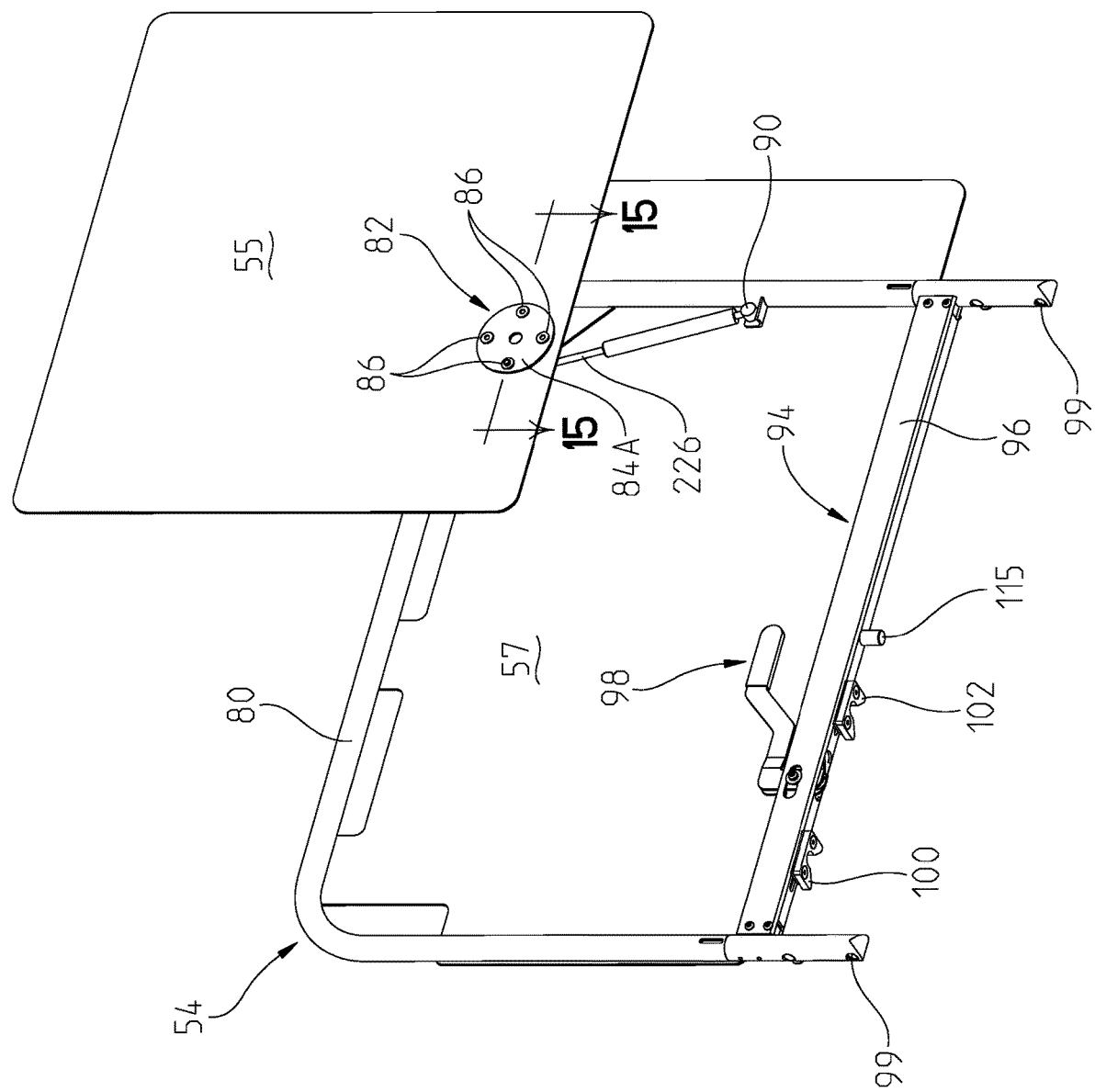
FIG. 3 illustrates a perspective view of a handrail assembly in a raised position having a shield in a raised position.
Figure 4:
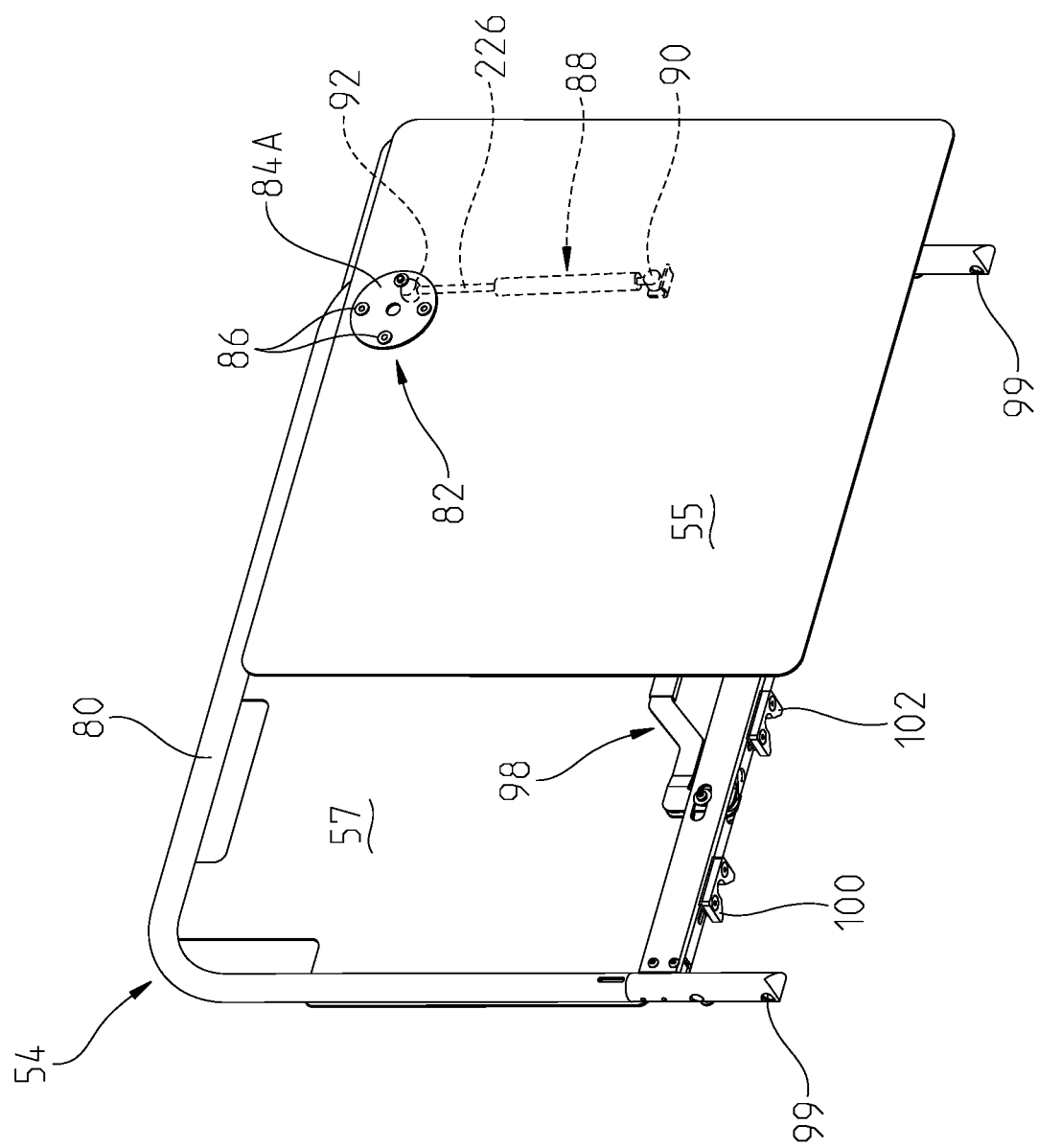
FIG. 4 illustrates a perspective view of a handrail assembly in a raised position having a shield in a lowered position.

FIG. 3 illustrates the first handrail assembly 54 including the upper shield 55 and the lower shield 57. This description of the first handrail assembly 54 applies to the hand rail assembly as they are similarly constructed. As seen in FIG. 3, the hand rail assembly 54 includes a handrail 80 to which the lower shield 57 is connected. Handrail assembly 56 includes a handrail 81 as seen in FIG. 2. The upper shield 55 is rotatably connected with respect to the lower shield 57. A connector 82, including a disc 84A, is connected to the upper shield 55 by a plurality of connectors 86. A resilient member, such as a gas spring 88, includes a first end 90 connected to the handrail 80 and a second end 92, as seen in FIG. 4. The upper shield 55 moves from a raised position of FIG. 3, to a lowered position of FIG. 4. The raised position of the upper shield 55 is illustrated in FIG. 1 and blocks a passenger located on the platform 42 from having access to the scissor leg assemblies 36 and 38 as platform 42 moves.

The handrail assembly 54 further includes a latch assembly 94 including a latch housing 96 and a latch handle 98 that moves from an unlatched position of FIG. 3 to the latched position of FIG. 1. In FIG. 3, the unlatched position of the latch handle 98 enables each of the handrail assemblies 54 and 56 to move to the folded positions of FIG. 8. The handrail 80 includes pivot connections 99 rotatably connected to the sidewall 48, also seen in FIG. 8. The latch assembly 94 includes a first catch 100 which engages a slide bar assembly 160 later described in FIGS. 5, 6, and 7. A second catch 102 engages a pin 110 which is fixed to the sidewall 48.

Figure 8:
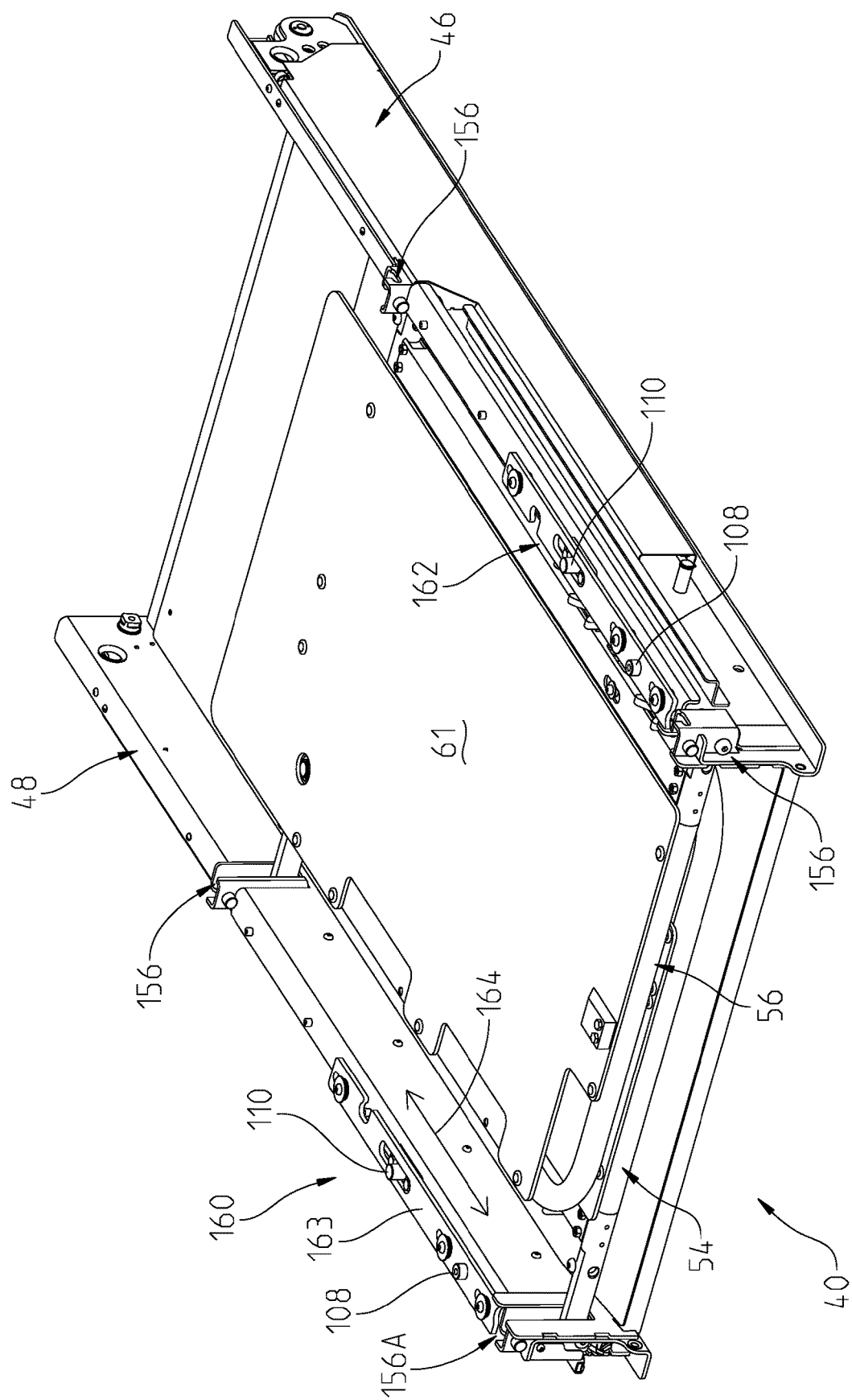
FIG. 8 illustrates a platform assembly of a wheelchair lift assembly with siderail assemblies in a folded position.
Figure 10:
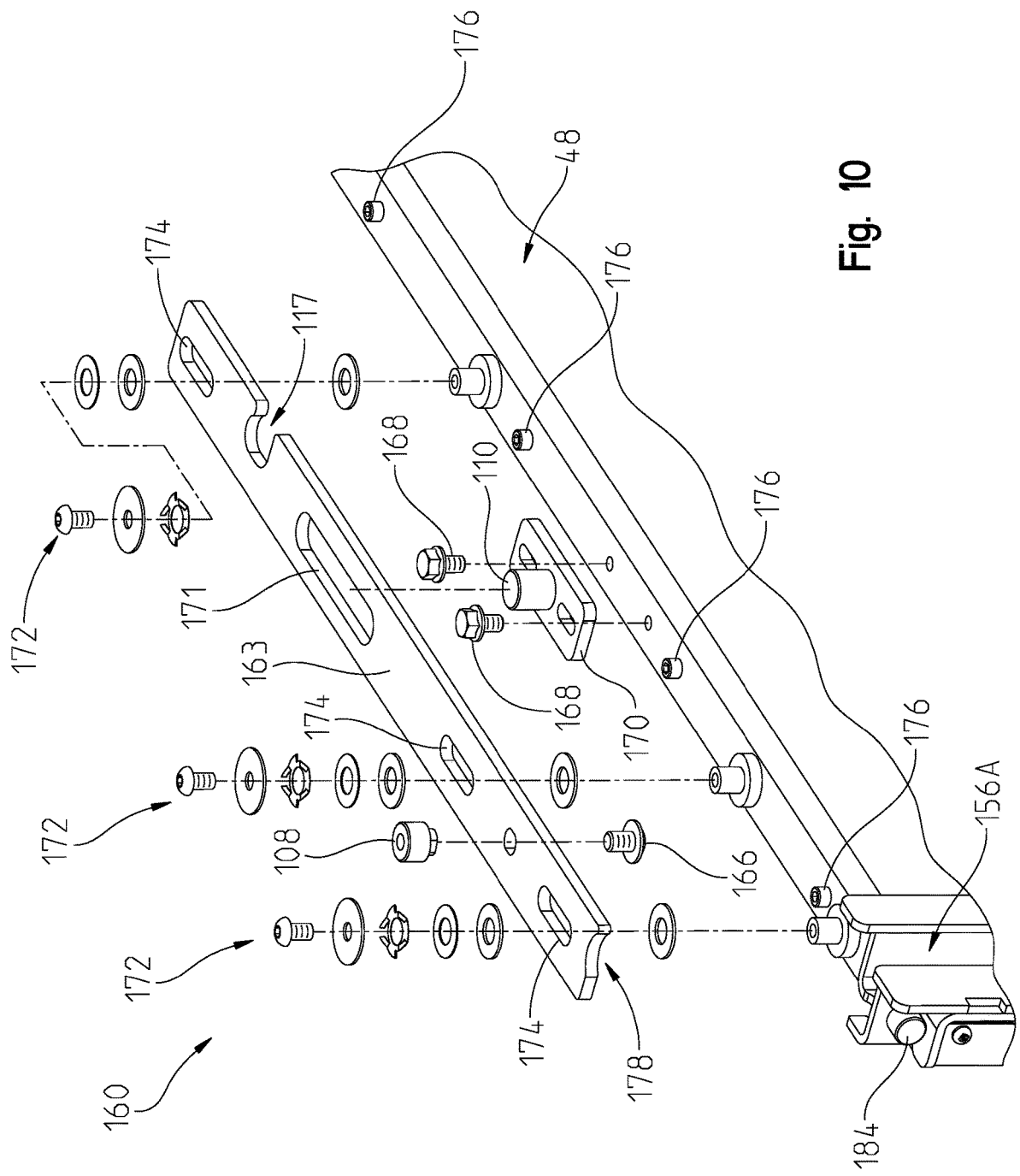
FIG. 10 illustrates an exploded view of a slide bar assembly adjacent to a siderail.

The first catch 100 and the second catch 102 are fixedly connected to the latch housing 96 and each respectively includes a notch 104 and 106. The notch 104 engages a pin 108 and the notch 106 engages the pin 110 as illustrated in FIG. 8. While the notches 104 and 106 are illustrated as including an open side, other catches configured to engage the pins 108 and 110 are contemplated, including closed apertures. The housing 96 includes a slot 112 configured to enable a latch handle assembly 114, including latch handle 98, to move from the position of FIG. 6 to the position of FIG. 2. A standoff 115, that extends from the housing 96, engages notch 117 on slide bar assembly 160 as seen in FIG. 10.

Figure 5:
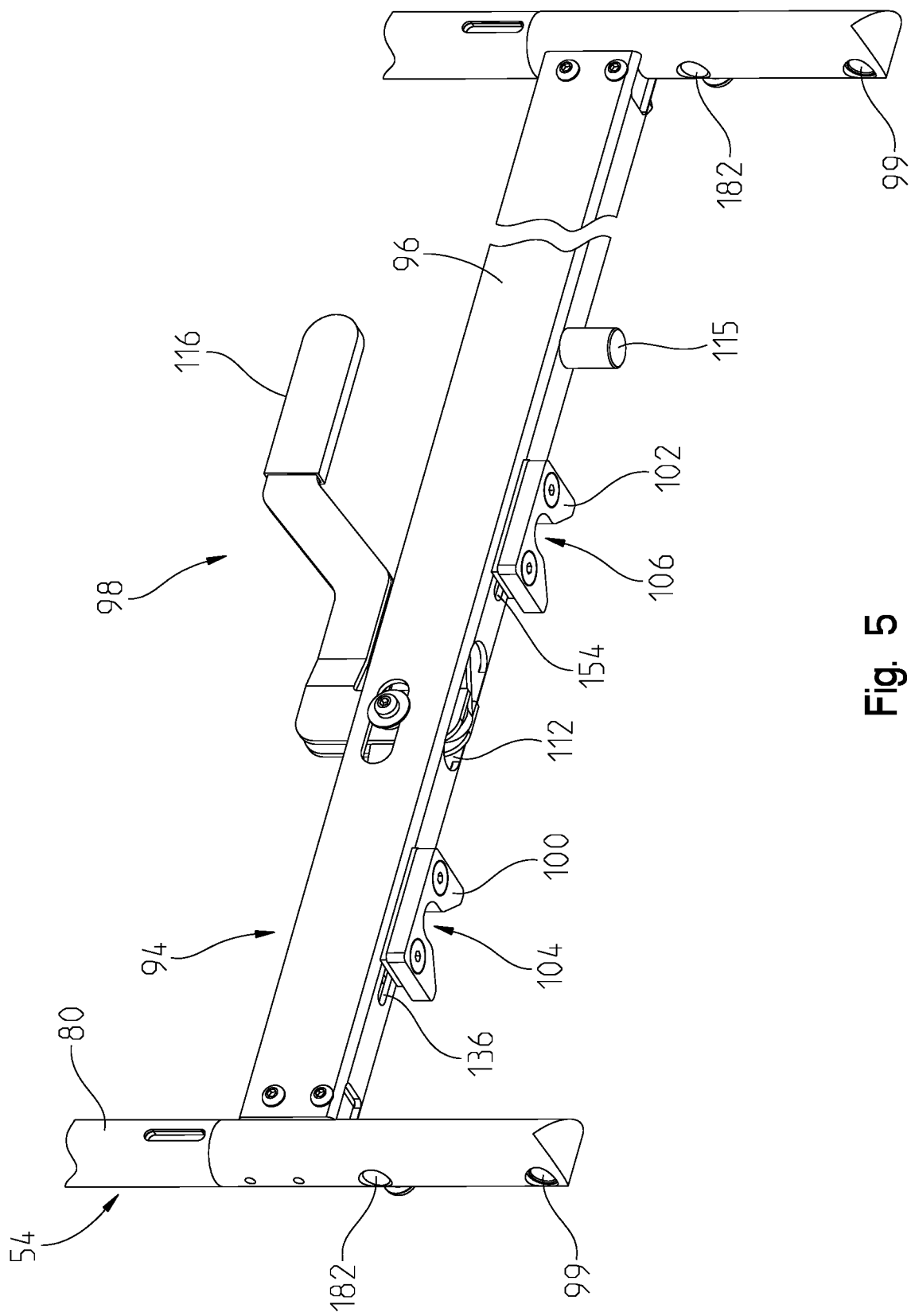
FIG. 5 illustrates a perspective view of a latch assembly for a siderail assembly.
Figure 6:
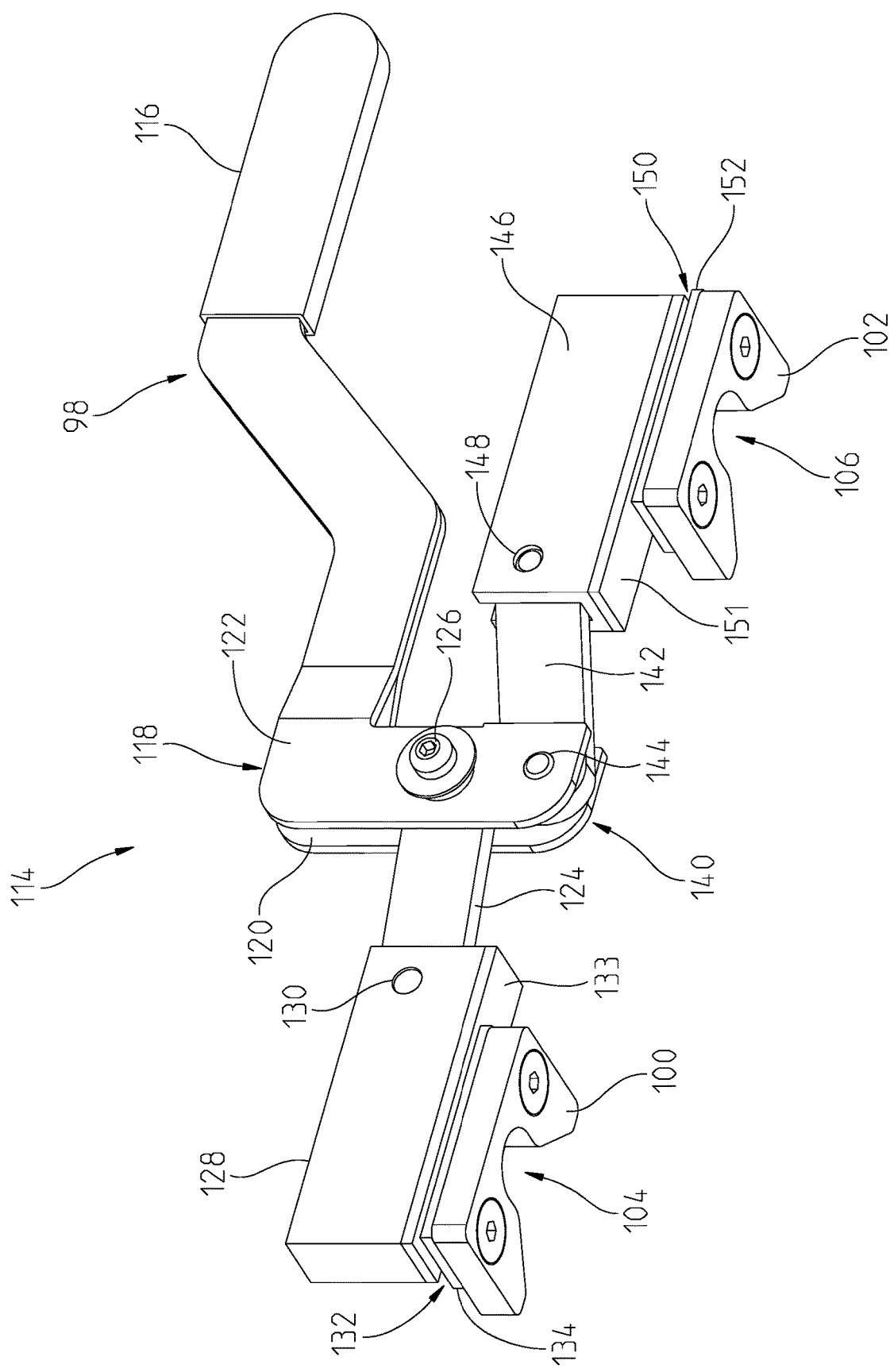
FIG. 6 illustrates a perspective view of a portion of a latch assembly for a siderail assembly.
Figure 7:
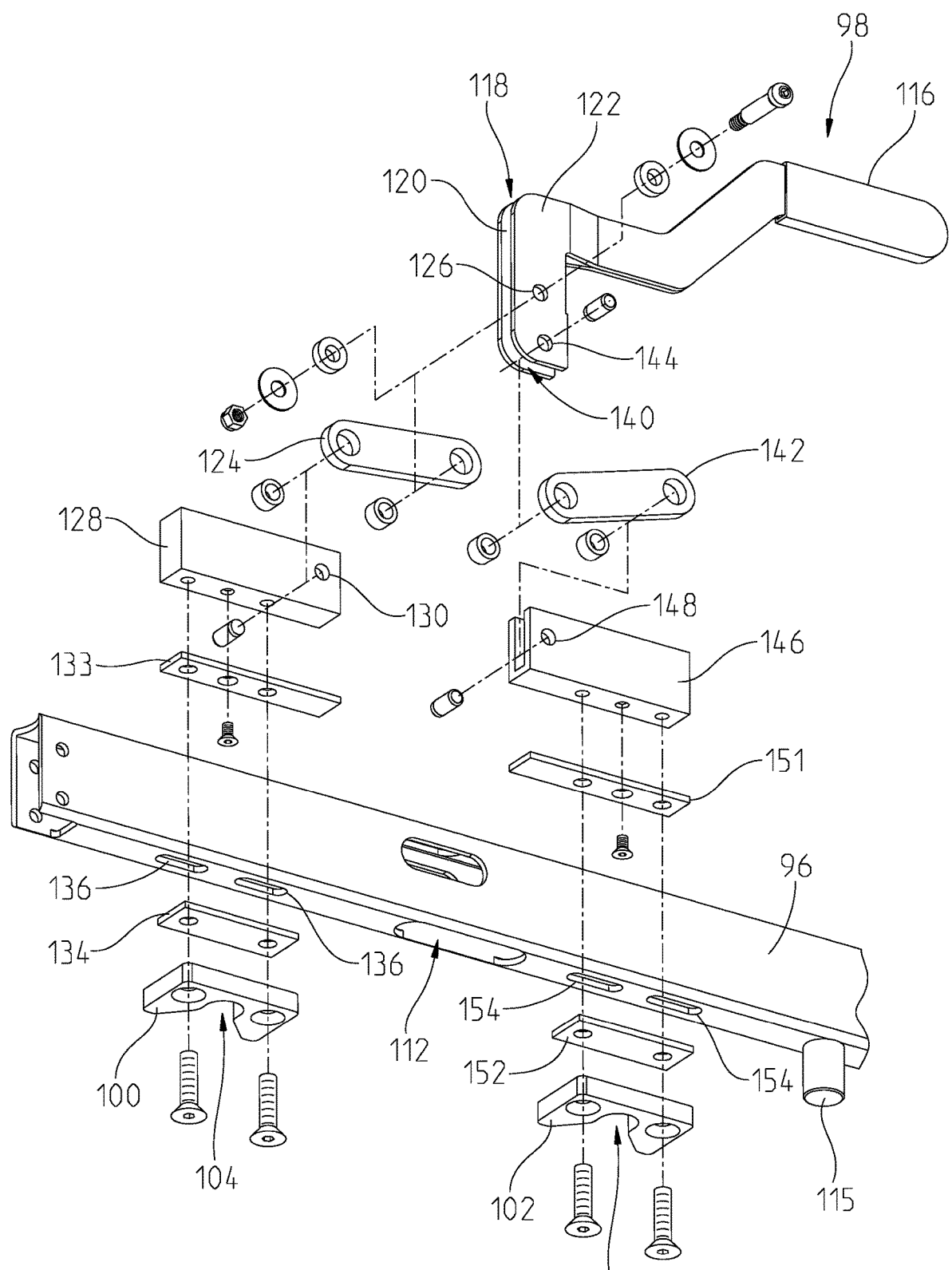
FIG. 7 illustrates an exploded view of a latch assembly for a siderail assembly.

As seen in FIGS. 6 and 7, the latch handle 98 includes a grip end 116 that extends towards a coupler 118 having a first side 120 spaced from a second side 122 to receive an arm 124. The arm 124 is connected between the first side 120 and the second side 122 at a pivot 126. The arm 124 is also pivotally connected to a block 128 at a pivot 130. The first catch 100 is fixedly connected to the block 128 and a space 132 is located between a spacer 133, which is adjacent to the block 128, and a spacer 134 located adjacently to the first catch 100. As seen in FIGS. 5 and 7, the housing 96 includes slots 136 along which the first catch 100 moves. A portion of the housing 96 is located at the space 132. Each of the spacers 133 and 134, located on either side of the housing 96, provides for sliding movement of the first catch 100 as it moves along the slots 136.

At an end 140 of the coupler 118, an arm 142 is pivotally connected at a pivot 144. A block 146 is pivotally connected to an opposite end of the arm 142 at a pivot 148. The catch 102 is fixedly connected to the block 146 and a space 150 is located between a spacer 151, adjacent to the block 146, and a spacer 152. A portion of the housing 96 is located at the space 150 which enables the catch 102 to move along slots 154.

The platform assembly 40 of FIG. 8 shows the first handrail assembly 54 in a lowered position located next to the platform plate 51 and the second handrail assembly 56 in a lowered position adjacent to the first handrail assembly 54. The first and second handrail assemblies 54 and 56 are folded together to provide for moving the wheelchair lift 24 to the stowed position. Each of the handrail assemblies 54 and 56 include support structures 156 that rotatably support the handrail assemblies 54 and 56.

Figure 9:
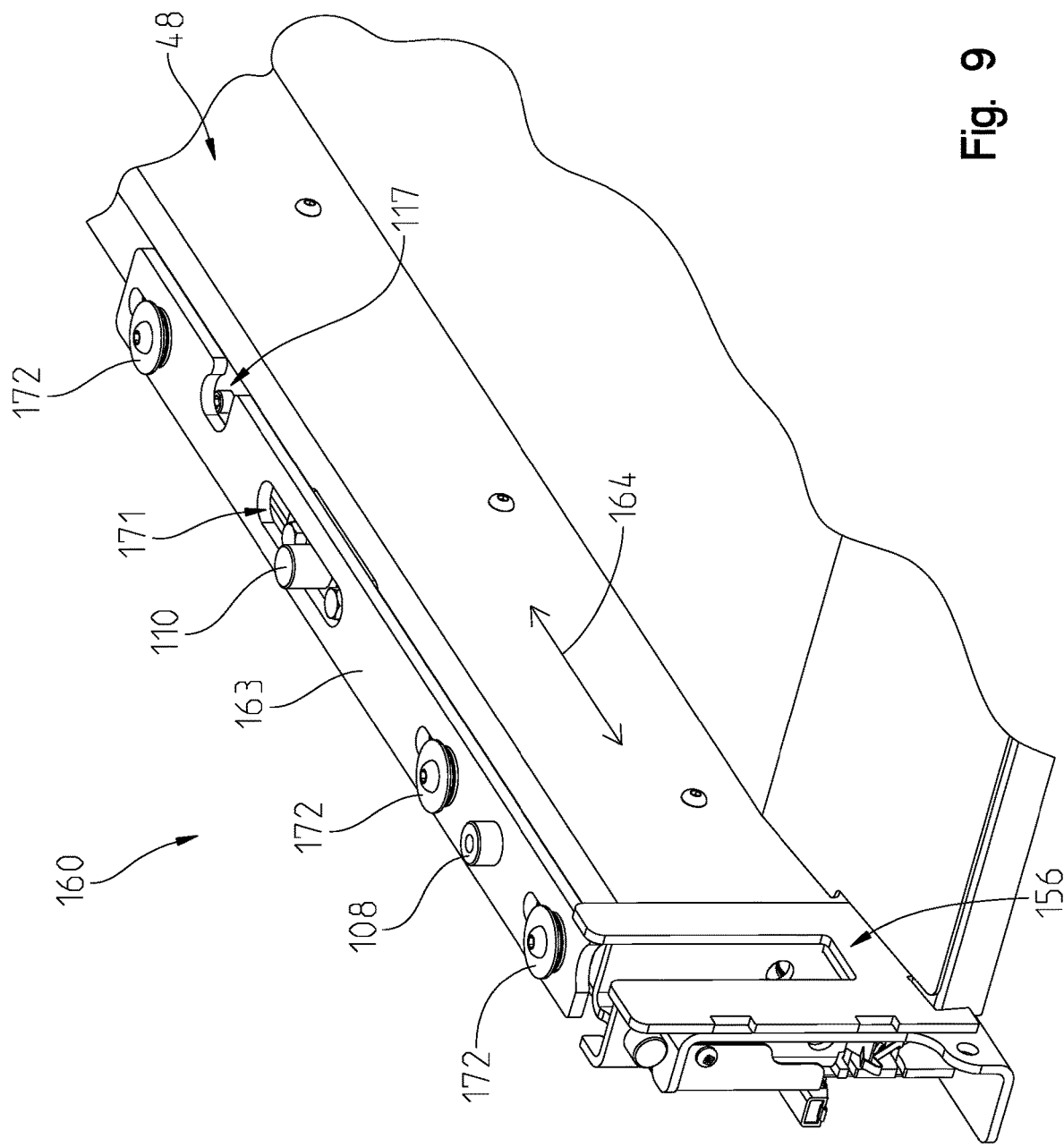
FIG. 9 illustrates a portion of a platform assembly for a wheelchair lift assembly including slide bar assembly.

FIGS. 8, 9, and 10 illustrate the slide bar assembly 160 which interfaces with the latch assembly 94 of FIG. 5. The slide bar assembly 160 is coupled to the sidewall 48. A slide bar assembly 162 is similarly constructed as slide bar assembly 160 and is coupled to the sidewall 46. Consequently, the description of slide bar assembly 160 applies equally to slide bar assembly 162.

The slide bar assembly 160 includes a slide bar 163 which moves longitudinally along the length of the sidewall 48 in a direction 164. When the latch handle 98 is moved from the unlocked position of FIG. 3 to the locked position of FIG. 2, the slide bar 163 moves the handrail assembly 54 toward the support structure 156A.

The pin 108 is fixedly connected to the slide bar 163 with a connector 166. The pin 110 is fixedly connected to the sidewall 48 with a connector 168 that extends to and is supported by a support plate 170. The pin 110 extends through a slot 171 of the slide bar 163. Slide positioners 172 extend through slots 174 of the slide bar 163 wherein the slots 174 include a sufficient length to enable sliding movement and to restrict the movement along direction 164. Each of the slide positioners 172 includes connectors to fixedly connect the slide bar 163 to the sidewall 48. Screws 176 are used to attach the bearing guide rails to the platform 42 for roller bearings 69 to roll on. The slide bar 163 includes a notch 178 which is curved inwardly toward the length of the slide bar 163 and which engages a side surface of the handrail 80 as seen in a sectional view of FIG. 11.

Figure 11:
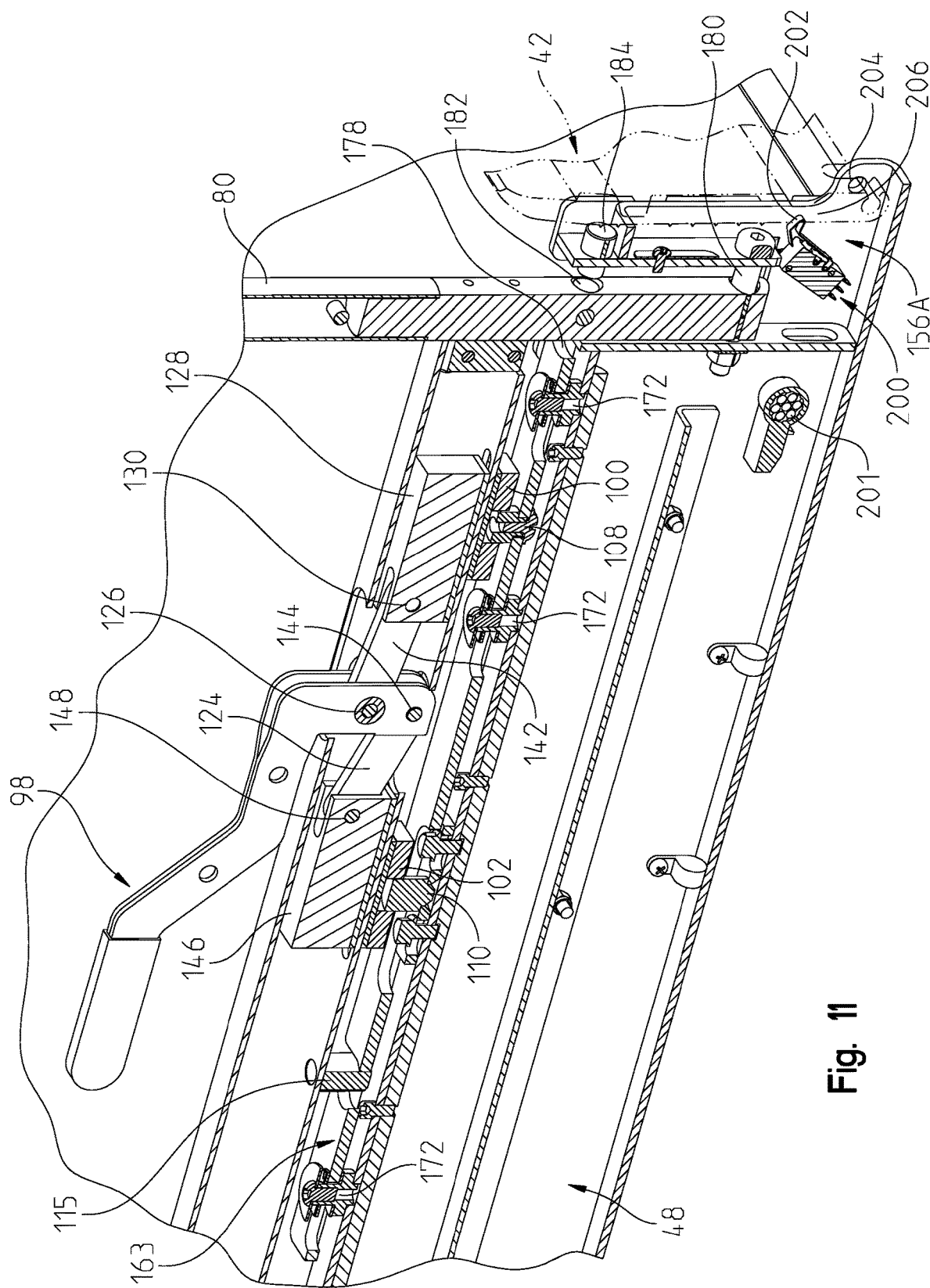
FIG. 11 illustrates a sectional view of a latch assembly for a siderail assembly.

In the unlatched position of FIG. 11, the notch 178 is spaced from the siderail 80 prior to the latch handle 98 being moved the latched position of FIG. 2. The first catch 100 engages the pin 108 and the second catch 102 engages the pin 110. Since the pin 110 is fixed to the sidewall 48 and the pin 108 is fixed to the slide bar 163, moving the latch handle 98 from the position of FIG. 11 to the position of FIG. 2, moves the notch 178 of slide bar 163 to engage the handrail 80. As the latch handle 98 is raised, contact of the notch 178 with the handrail 80 moves the handrail assembly 54 along a pivot shaft 180 supported by the support structure 156. Since the pin 110 is fixed to the sidewall 48 and the pin 108 is fixed to the slide bar 163, as the latch handle 98 is raised the distance between the pin 108 and the pin 110 is lengthened. As the handrail assembly 54 moves toward the support structure 156A, an aperture 182 located in the handrail 80 engages a pin 184 supported by the support structure 156A. In one embodiment, each pivoting end of the handrails 80 and 81 include the apertures 182 and each support structure 156 includes the pin 184. In another embodiment, the location of the apertures and the pins are reversed. Moving the latch handle 98 from the raised position to the lowered position disengages the handrails from the pins to enable the support assemblies to be moved to the folded positions of FIG. 8. Pin 115 engages with a notch 117 in slidebar 163 (see FIG. 10) to slide handrails back from the locked position to be lowered from the unlocked position as illustrated FIG. 11.

Figure 12:
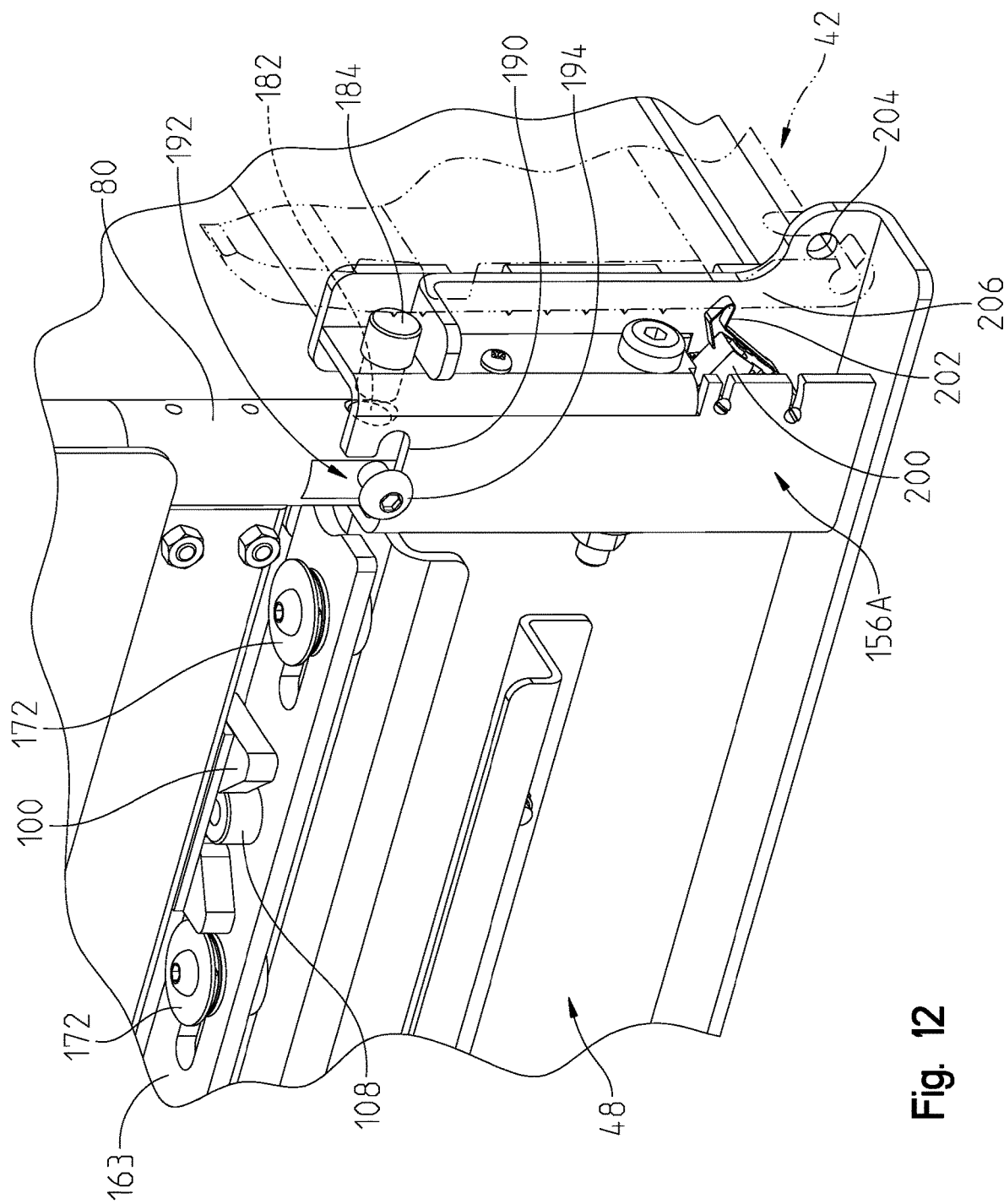
FIG. 12 illustrates a portion of a latch assembly for a siderail assembly.

In addition to the pin 184 engaging the aperture 182, the support structure 156A includes a slot 190 configured to receive a slot pin 192, as illustrated in FIG. 12. The slot pin 192 extends from the rail arm 80 in a direction generally perpendicular to the sliding movement of the handrail assembly 54. The slot 190 is defined on either side by portion of the support structure 156A such that when the slot pin 192 moves into the slot 190, a head 194 of the slot pin 190 extends over the side portion of the support structure 156A to substantially prevent pivotal movement of the handrail assembly 54. Movement of the handrails to the support structures when the pin 192 engages the slot 190 provides an additional mechanism to prevent pivotal movement of the handrail assemblies in addition to pins 184. In other embodiments, only the pin 184 engaging the apertures 182 or only the slot pin 192 engaging the slot 190 are contemplated.

A switch 200, as seen in FIGS. 11 and 12, is supported by the support structure 156A and includes an arm 202 which when depressed indicates a position of the platform 42, shown in dotted outline. The switch 202 is electrically connected to an electrical connector 201. As the outboard barrier 42 pivots about a platform pivot 204, a portion 206 of the outboard barrier 42 moves into contact with the arm 202. When the arm 202 is depressed, the switch 200 generates a signal to a controller which determines the position of the outboard barrier 42. As seen in FIG. 12, the portion 206 that contacts the arm 202 is a generally flat portion of the outboard barrier 42 which depresses the arm 202 when the outboard barrier 42 is in the raised position. In other embodiments, the switch 200 includes an arm 202 that is positioned to determine when the outboard barrier 42 is in the lowered position.

Prior to moving the handrail assembly 54 and the handrail assembly 56 to the folded position of FIG. 8, the upper shield 55 of handrail assembly 54 is moved to the down position as illustrated in FIG. 4. At the same time, the upper shield of the handrail assembly 56 is also moved to the down position to provide for folding of handrail assembly 56 with the handrail assembly 54. As seen in an exploded view of FIG. 13 and a partial view of FIG. 14, the disc 84A is coupled to the upper shield 55 on one side of the shield and the disc 84 is coupled to the other side of the shield 55 with connectors 86. The second end 92 of the gas spring 88 is rotatably connected to the disk 84 through the shield 55 and to the disc 84A. A sleeve 210 is fixedly connected to the disc 84 and extends through a locator 212, including a cylinder 214 and a tab 216 that is fixedly coupled to the cylinder 214. The tab 216 includes a projection (not shown) that extends through a slot (not shown) of a plate 218. The projection extending through the slot fixes the location of the locator 212 with respect to the plate 218. The plate 218 is fixedly connected to the handrail 80 such that the locator 212 does not move with respect to the plate 218 and does not move with respect to the shield 55. The end 90 of the gas spring 88 is held in place with a bracket 220 that is fixedly connected to the handrail 80 by a connector 222. In another embodiment, the plate 218 is connected to the shield 55. In a further embodiment, the plate 218 is not included and the shield 55 supports the connector 82 and gas spring 88.

Figure 13:
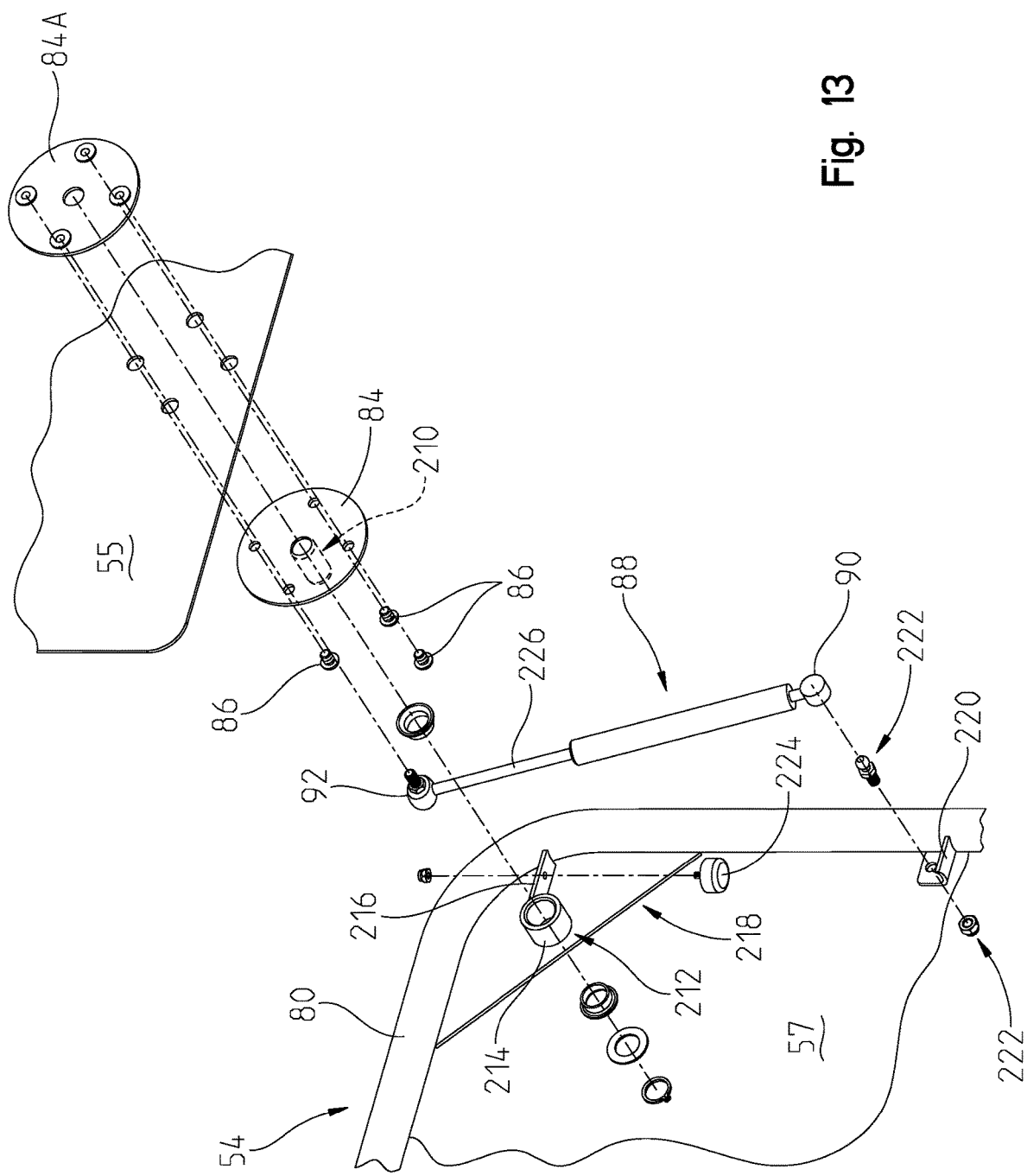
FIG. 13 illustrates an exploded view of a portion of a handrail assembly including a gas spring.
Figure 14:
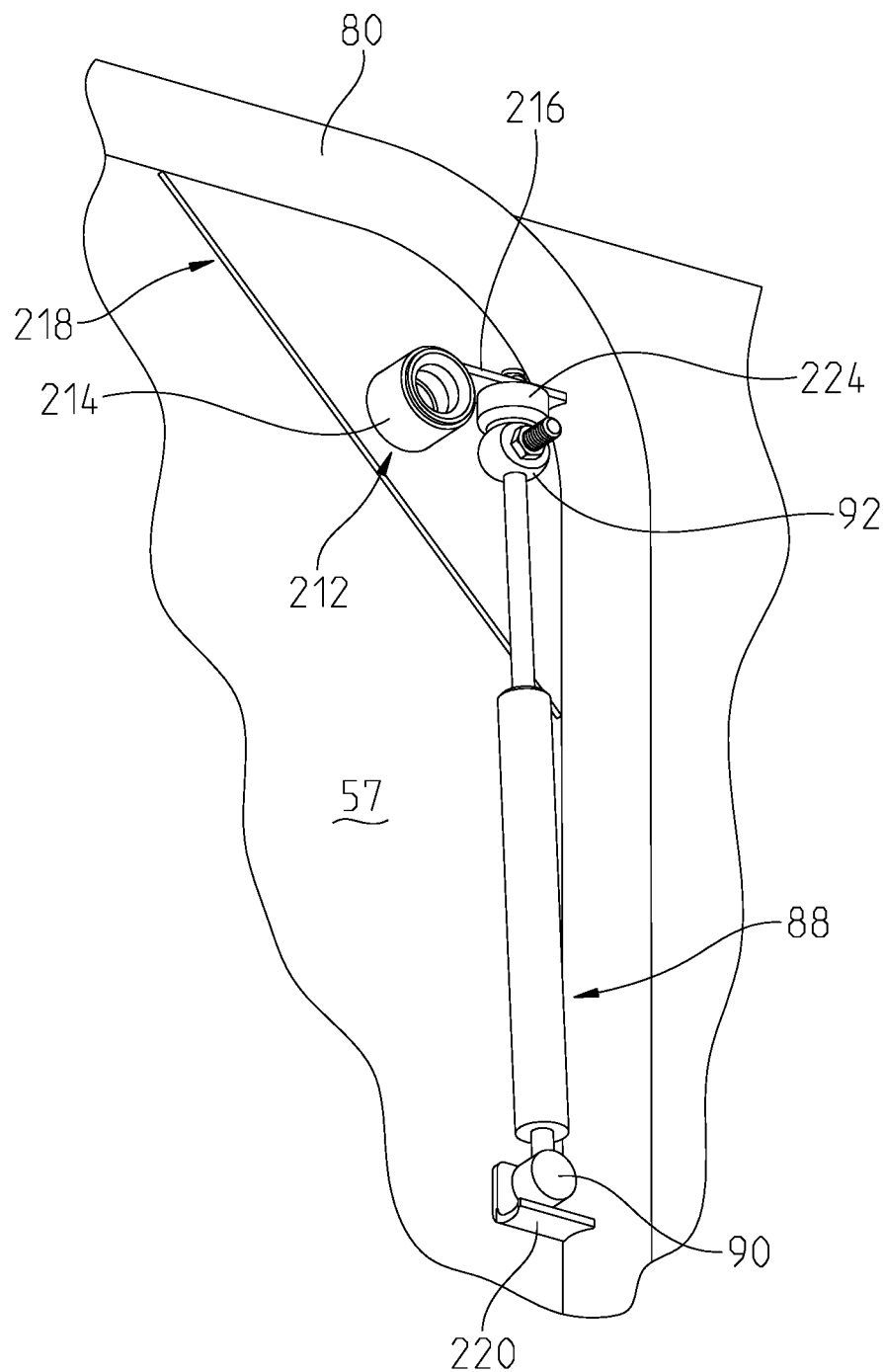
FIG. 14 illustrates a portion of a handrail assembly including a gas spring when a shield of the handrail assembly is in a down position.

As seen in FIGS. 13 and 14, a bumper 224 is connected to the tab 216 which limits rotation of the shield 55 with respect to the lower shield 57. When the shield 55 is located in the upper position of FIG. 3, an arm 226 of the gas spring 88 is fully extended and limits rotation of the shield 55 in the raised position. As the shield 55 is moved from the raised position to the lowered position of FIG. 4, the gas spring 88 moves from the position of FIG. 3 to the position of FIG. 14 where rotation of the shield 55 with respect to the shield 57 is stopped when the end 92 contacts the bumper 224.

Figure 15:
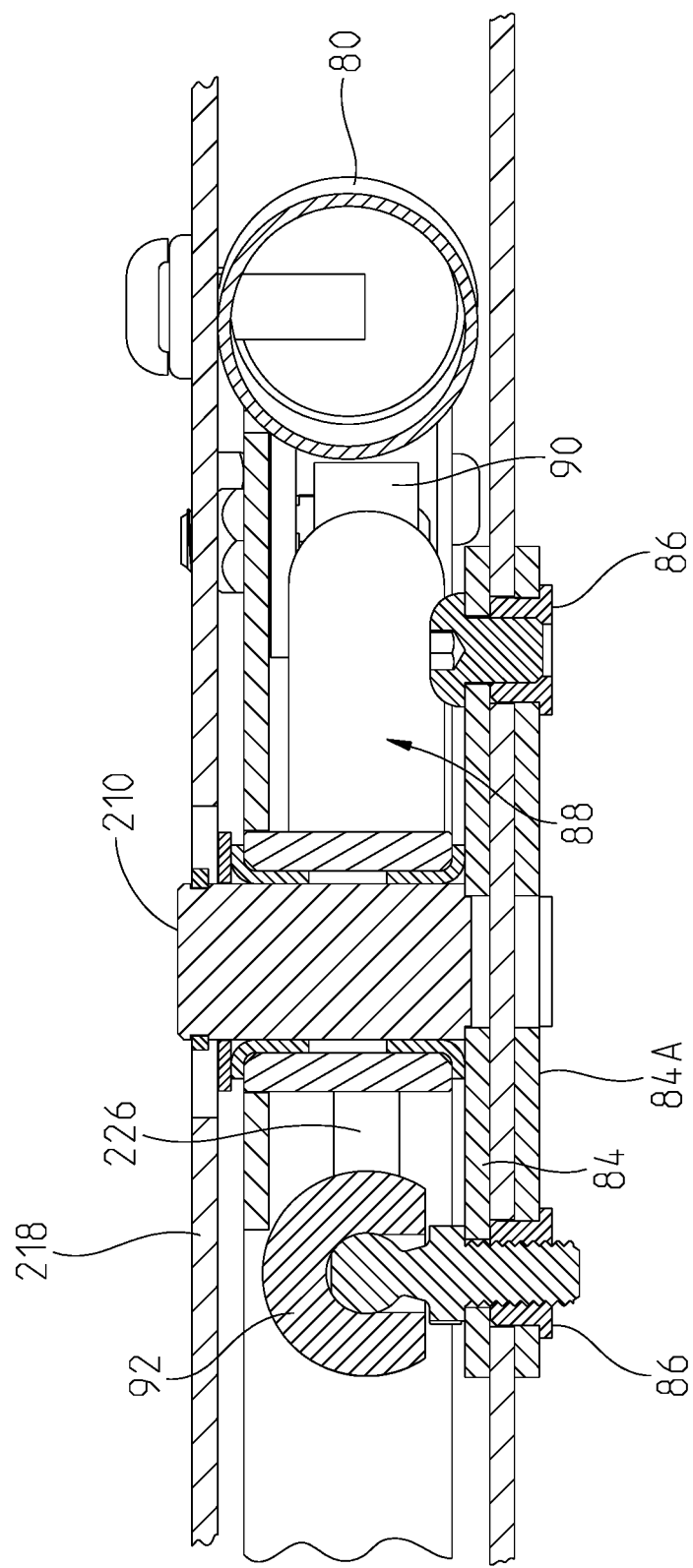
FIG. 15 is sectional view of the handrail assembly of FIG. 3.

FIG. 15 illustrates a sectional view of the handrail assembly 54 of FIG. 3. In this view, it can be seen that the gas spring 88 extends from one side of the sleeve 210 (at the end 92) to the other side of the sleeve 210 at the end 90. As the shield 55 rotates to the lowered position of FIG. 4, the end 92 is positioned at another side of the sleeve 210.

As described herein, the first handrail assembly 54 and second handrail assembly 56 provide a shielding system that directs an occupant of the platform assembly 40 away from each of the scissor assemblies 36 and 38. The handrail assemblies 54 and 56 are also easily moved from a shielding positions of FIGS. 1 and 2 to the folded positions of FIG. 8. Consequently, the relative ease of moving between positions does not hamper an operator or other individual from moving the handrail assemblies between positions when needed.

While exemplary embodiments incorporating the principles of the present invention have been disclosed herein, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A wheelchair lift for a passenger bus comprising:
a housing;
a lift assembly coupled to the housing;
a platform coupled to the lift assembly;
a first handrail assembly coupled to the platform, the first handrail assembly including a lower handrail shield coupled to a first handrail, and an upper handrail shield rotatably coupled to the lower handrail shield and moveable between a lowered position and a raised position with respect to the lower handrail shield, wherein the upper handrail shield in the lowered position is moveable with the lower handrail shield between a storage location and a boundary location.

2. The wheelchair lift of claim 1 further comprising a second handrail assembly coupled to the platform, the second handrail assembly including a lower handrail shield coupled to a second handrail, and an upper handrail shield rotatably coupled to the lower handrail shield and moveable between a lowered position and a raised position with respect to the lower handrail shield, wherein the upper handrail shield in the lowered position is moveable with the lower handrail shield between a storage location and a boundary location.

3. The wheelchair lift of claim 2 wherein the first handrail assembly includes a gas spring coupled to the upper handrail shield and to the lower handrail shield, wherein the gas spring maintains a position of the upper handrail shield with the lower handrail shield.

4. The wheelchair lift of claim 3 wherein the second handrail assembly includes a gas spring coupled to the upper handrail shield and to the lower handrail shield, wherein the gas spring maintains a position of the upper handrail shield with the lower handrail shield.

5. The wheelchair lift of claim 2 wherein the platform includes a platform plate and wherein the first handrail assembly and the second handrail assembly each include a first position extending generally perpendicular to the platform plate and a second position generally parallel to the platform plate.

6. The wheelchair lift of claim 5 wherein when the first handrail assembly and the second handrail assembly are in the second position, one of the first and second handrail assemblies overlaps the other of the first and second handrail assemblies.

7. The wheelchair lift of claim 2 wherein the platform includes a first sidewall and a second sidewall and wherein the first handrail is rotatably coupled to the first sidewall and the second handrail is rotatably coupled to the second sidewall.

8. The wheelchair lift of claim 7 wherein the first handrail slides longitudinally along the first sidewall and the second handrail slides longitudinally along the second sidewall.

9. The wheelchair lift of claim 8 wherein the first handrail assembly includes a first latch assembly having a latched position and an unlatched position, wherein in the latched position a pin engages the first handrail to prevent the first handrail assembly from moving between the first position and the second position.

10. The wheelchair lift of claim 9 wherein the second handrail assembly includes a second latch assembly having a latched position and an unlatched position, wherein in the latched position a pin engages the second handrail to prevent the second handrail assembly from moving between the first position and the second position.

11. The wheelchair lift of claim 10 wherein the first latch assembly includes a latch handle coupled to a linkage and a slide bar coupled to the linkage, wherein the latch handle moves the slide bar into engagement with the first handrail in the latched position and out of engagement with the first handrail in the unlatched position.

12. The wheelchair lift of claim 11 wherein the linkage includes a first end fixedly coupled to the first handrail and the second end fixedly coupled to the slide bar, wherein the slide bar moves along the first handrail in response to the latch handle moving from latched position to engage the first handrail to the pin and an unlatched position to disengage the first handrail from the pin.

13. The wheelchair lift of claim 12 wherein the pin is connected to the first handrail.

14. A passenger bus comprising:
a body having an entrance and a storage compartment located below the entrance; and
a wheelchair lift including a stowed position located within the storage compartment and having a deployed position extending from the storage compartment, wherein the wheelchair lift includes:
a housing;
a lift assembly coupled to the housing;
a platform coupled to the lift assembly;
a first handrail assembly coupled to the platform, the first handrail assembly including a lower handrail shield coupled to a first handrail, and an upper handrail shield rotatably coupled to the lower handrail shield and moveable between a lowered position and an raised position with respect to the lower handrail shield, wherein the upper handrail shield in the lowered position is moveable with the lower handrail shield between a storage location and a boundary location.

15. The passenger bus of claim 14 further comprising a second handrail assembly coupled to the platform, the second handrail assembly including a lower handrail shield coupled to a second handrail, and an upper handrail shield rotatably coupled to the lower handrail shield and moveable between a lowered position and an raised position with respect to the lower handrail shield, wherein the upper handrail shield in the lowered position is moveable with the lower handrail shield between a storage location and a boundary location.

16. The passenger bus of claim 15 wherein the first handrail assembly includes a gas spring coupled to the upper handrail shield and to the lower handrail shield, wherein the gas spring maintains a position of the upper handrail shield with the lower handrail shield.

17. The passenger bus of claim 16 wherein the second handrail assembly includes a gas spring coupled to the upper handrail shield and to the lower handrail shield, wherein the gas spring maintains a position of the upper handrail shield with the lower handrail shield.

18. The passenger bus of claim 17 wherein the platform includes a platform plate and wherein the first handrail assembly and the second handrail assembly each include a first position extending generally perpendicular to the platform plate and a second position generally parallel to the platform plate.

19. The passenger bus of claim 18 wherein when the first handrail assembly and the second handrail assembly are in the second position, one of the first and second handrail assemblies overlaps the other of the first and second handrail assemblies.

20. The passenger bus of claim 15 wherein the platform includes a first sidewall and a second sidewall and wherein the first handrail is rotatably coupled to the first sidewall and the second handrail is rotatably coupled to the second sidewall.

21. The passenger bus of claim 20 wherein the first handrail slides longitudinally along the first sidewall and the second handrail slides longitudinally along the second sidewall.

22. The passenger bus of claim 21 wherein the first handrail assembly includes a first latch assembly having a latched position and an unlatched position, wherein in the latched position a pin engages the first handrail to prevent the first handrail assembly from moving between the first position and the second position.

23. A method of moving a wheelchair lift from a stowed position to a deployed position, wherein the wheelchair lift includes a first siderail assembly and a second siderail assembly respectively connected to a first side and to a second side of a platform, the method comprising:
moving the first siderail assembly longitudinally along the length of the first side in response to movement of a first latch arm;
moving the second siderail assembly longitudinally along the length of the second side in response to movement of a second latch arm;
preventing pivotal movement of the first siderail assembly with respect to the first side by engaging a first pin during longitudinal movement of the first siderail assembly; and preventing pivotal movement of the second siderail assembly with respect to the second side by engaging a second pin during longitudinal movement of the first siderail assembly.

* * * * *